United States Patent
McCoy (10) Patent No.: US 7,942,371 B1
(45) Date of Patent: May 17, 2011

(54) CONDUIT SPACER FOR DUCT BANKS

(75) Inventor: Donald P. McCoy, Lake Forest, IL (US)

(73) Assignee: Underground Devices, Inc., Northbrook, IL (US)

(*) Notice: Subject to any disclaimer, the term of this patent is extended or adjusted under 35 U.S.C. 154(b) by 0 days.

(21) Appl. No.: 12/770,959

(22) Filed: Apr. 30, 2010

(51) Int. Cl.
*F16L 3/22* (2006.01)

(52) U.S. Cl. ..................................................... 248/68.1

(58) Field of Classification Search .................. 248/68.1, 248/49, 65, 74.1; 211/59.4, 70.3, 70.4, 85.22; 138/113; 174/481, 66, 68.3
See application file for complete search history.

(56) References Cited

U.S. PATENT DOCUMENTS

| | | | |
|---|---|---|---|
| 792,692 A | 6/1905 | Gest | |
| 1,805,990 A | 5/1931 | Makowski | |
| 1,821,234 A | 9/1931 | Parker | |
| 2,462,399 A | 2/1949 | Hinchman | |
| 2,686,643 A | 8/1954 | Bloom et al. | |
| 2,849,027 A | 8/1958 | Tetyak | |
| 2,937,833 A | 5/1960 | Sachs | |
| 3,125,196 A | 3/1964 | Fenner | |
| 3,154,281 A * | 10/1964 | Charles | 248/201 |
| 3,464,661 A | 9/1969 | Aiesi | |
| 3,523,667 A | 8/1970 | Guemero | |
| 3,643,005 A | 2/1972 | Mathews | |
| 3,765,629 A | 10/1973 | Voelker | |
| 3,856,246 A | 12/1974 | Sinko | |
| 3,964,707 A | 6/1976 | Lewis | |
| 4,099,626 A | 7/1978 | Mangussen | |
| 4,114,241 A | 9/1978 | Bisping | |
| 4,183,464 A | 1/1980 | Matthews | |
| 4,244,542 A | 1/1981 | Mathews | |
| 4,306,697 A | 12/1981 | Mathews | |
| 4,601,447 A | 7/1986 | McFarland | |
| 4,618,114 A | 10/1986 | McFarland | |
| 4,834,825 A | 5/1989 | Adams et al. | |
| 5,018,260 A | 5/1991 | Ziu | |
| 5,104,072 A | 4/1992 | Kuo | |
| 5,137,306 A | 8/1992 | Flood | |
| 5,372,388 A | 12/1994 | Gargiulo | |
| 5,605,419 A | 2/1997 | Reinert, Sr. | |
| 5,992,802 A * | 11/1999 | Campbell | 248/68.1 |

(Continued)

OTHER PUBLICATIONS

Carlon Snap-Loc Spacers Brochuer and Literature, pp. 225-226, Installation instructions (2 pages), and Specifications (1 page), dated 2007, total 5 pages.

*Primary Examiner* — Ramon O Ramirez
(74) *Attorney, Agent, or Firm* — David W. Okey LLC (57) ABSTRACT

Conduit spacers useful in preparing duct banks are disclosed. The conduit spacers are designed for attachment to each other in vertical and horizontal combinations, that is, they may be arranged in side-by-side arrays, up-and-down arrays, or arrays that are both side-to-side and up-and-down. Thus, the conduit spacers include both vertical and horizontal restraints or interlocks. The vertical interlocks are achieved by the use of tapered tabs and tapered slots, both the tabs and the slots having tapers in the same horizontal direction. Horizontal interlocks are made by the use of rails and matching grooves in the sides of the spacers. Thus, both vertical and horizontal interlocks are achieved by assembling the ducts in a horizontal direction, side-by-side as desired for width, and up-and-down as desired for height. The number and length of conduits and the length of the duct banks needed dictate how many spacers are needed.

32 Claims, 7 Drawing Sheets

U.S. PATENT DOCUMENTS

| | | |
|---|---|---|
| 6,076,863 A | 6/2000 | Brown et al. |
| 6,242,700 B1 | 6/2001 | Smith |
| 6,375,017 B1 | 4/2002 | Schattner et al. |
| 6,711,328 B2 | 3/2004 | Griffoen et al. |
| 6,725,642 B2 * | 4/2004 | Tsutsumi et al. .............. 59/78.1 |
| 2005/0098688 A1 * | 5/2005 | Miarka et al. ................ 248/68.1 |
| 2008/0279635 A1 | 11/2008 | McCoy |
| 2009/0057497 A1 | 3/2009 | Bradbury |

\* cited by examiner

CONDUIT SPACER FOR DUCT BANKS

TECHNICAL FIELD

The technical field is that of spacers for separating and supporting power and communication conduits in underground trenches before and during the concrete pour.

BACKGROUND

Cables for electric power, control and communication lines are run underground in order to protect them from aboveground elements and from the interference and damage they would suffer when installed above the ground or on poles or other structures. Conduits, also called ducts, run underground for such cables should be parallel to each other and spaced apart from each other in a controlled manner in order to minimize any electrical interference. This spacing also acts to dissipate the heat generated by transmission of electric power and electric signals in the cables. In addition, the conduits and cables should be protected, primarily from digging, whether with hand tools or with mechanized equipment, such as backhoes.

A trench may be dug and conduits placed into the trench at a distance from each other. For example, a series of conduits may be placed side-by-side in the bottom of the trench and separated from each other by removable spacers. Once the conduits are placed, the spacers may be removed and all space between the conduits filled with earth, sand or concrete. Thus, the space is filled with thermally conducting but electrically insulating material. If there are to be several vertical layers of conduits, this procedure is very inefficient and time-consuming. In another prior art method, spacers are made with large teeth in the general form of a rake to define spaces between conduits. These spacers may then be used to organize and separate the conduits. However, maintaining vertical separation may be challenging with this method.

It is important to fill all the spaces between the conduits no matter which technique is used to space them apart. It is difficult to accomplish this when the conduits are in several vertical layers. The filler material ideally should be a flowable material, i.e., a material that flows freely downward and sideways in all directions when dispensed into the trench. A more-flowable filler material consists of 50 to 100 lb (about 23 to about 45 kg). Portland cement, 2750 lb (about 1250 kg) of fine sand, and 500 lbs. (about 227 kg) water (maximum) per cubic yard (about 0.765 cubic meters), having a 28-day compressive strength of 50-150 psi (about 0.34 MPa-about 1 MPa). A heavier but still flowable filler material includes a normal weight concrete mix with Portland cement, aggregate having a maximum size of ⅜ inch (about 9-10 mm), and sand and water. The heavier material has an 8 inch (about 203 mm) minimum slump and a 28-day compressive strength of 3000 psi (about 21 MPa). The ability to spread and fill the entire space is needed for good heat transfer and thermal conductivity.

One way to insure even spacing between conduits for power and communications cables is to fabricate banks of ducts which are separated by conduit spacers. The duct banks are then encased in concrete or other material as described above. After the concrete has hydrated or set, cables are pulled through the conduits. The concrete provides a heat transfer medium for conducting heat to the surface, normally the ground surface, and also protects the cables from moisture, rodents and any contractors attempting to dig in the immediate vicinity of the duct bank.

Fabrication of a duct bank typically requires preparing an assembly of conduits and spacers in a trench and then encasing the duct bank in concrete. One method of assembling the spacers is to simply place conduits into bores prepared in a first layer of one or more spacers, and then to place additional spacers and conduit atop the bottom layer. A sturdier assembly may be made by positively locking the conduits into the spacers and by locking the spacers themselves together. Spacers typically do not have easy and reliable ways to interlock to each other.

For example, U.S. Pat. No. 4,601,447, depicts conduit spacers with vertical interlocks made of snap-fit joints, with male snap-fit joints facing downward and female snap-fit joints facing upward. The snap-fits mate when the parts are assembled one-to-another vertically. Molding these snap-fit joints requires very tight tolerances on the tooling if the joints are to work and not interfere with assembly. In addition, the arced portion of the spacer, the portion in which the conduit rests, is relatively narrow and may not provide a sturdy and balanced support for a loaded conduit.

In another example, Snap-Loc spacer model SP4W20-2, made by the Carlon Co., Cleveland, Ohio, U.S.A., has slots well above the bottom of the spacer and tabs near the top of the spacer. The tabs are tapered with the narrow portion facing the feet and with the wide portion on the opposite site. The slots are also tapered; however, they are tapered in the opposite direction, with the wide portion on the feet side and with the narrow portion on the opposite side. This may be a result of the tooling used. Thus, when spacers are assembled together, it is more difficult to make the assembly because the tapers are opposed; once assembled, the resulting joint is loose. Of course, the spacers may be assembled with the tapers made in the same direction; if this done however, the vertical interlocks (feet) will face in opposite directions, and the spacers must be alternated in every layer or tier. This amount of detail is very difficult to accomplish in field situations. Even when this is accomplished, however, the fit is very loose and the assembly is not tight or strong. A five-page brochure on these spacers is included in an Information Disclosure Statement accompanying this patent and is hereby incorporated by reference in its entirety.

What is needed is a better conduit spacer suitable for assembly with matching conduit spacers to form a tight, coherent duct bank. These conduit spacers should be easy to assemble and should not require expensive or hard-to-manufacture tooling with very tight tolerances.

BRIEF SUMMARY

One embodiment is a conduit spacer. The conduit spacer includes a base having generally planar portions and having at least one contiguous convex portion adjacent the generally planar portions, at least two stacking slots connected to the base and on left and right sides of the base, each stacking slot having a taper in a general first direction (back to front or front to back) of a width of the base. The conduit spacer also includes at least one generally U-shaped body supported above the base, each U-shaped body having an open end extending away from said base and stacking tabs extending from both ends of each U-shaped body, said stacking tabs having a taper in a same general first direction (back to front or front to back) of a width of the base.

Another embodiment is a conduit spacer. The conduit spacer includes a base comprising generally planar portions and at least two stacking slots connected to the base and on left and right sides of the base, each stacking slot having a taper in a general first direction (back to front or front to back)

of a width of the base, wherein a narrower end of each stacking slot is blind and a wider end of each stacking slot is open. The conduit spacer also includes at least one generally U-shaped body supported above the base, each U-shaped body having an open end extending away from said base and stacking tabs extending from both ends of each U-shaped body, said stacking tabs having a taper in a same general first direction of a width of the base.

Another embodiment is a conduit spacer. The conduit spacer includes a base having generally planar portions and having at least one contiguous convex portion adjacent the generally planar portions and at least two stacking slots connected to the base, on left and right sides of the base, and opening to a bottom surface of the base, each stacking slot having a taper in a general first direction (back to front or front to back) of a width of the base. The conduit spacer also includes at least one generally U-shaped body supported above the base, each U-shaped body having an open end extending away from said base and stacking tabs extending from both ends of each U-shaped body, said stacking tabs having a taper in a same general first direction of a width of the base.

Yet another embodiment is a conduit spacer. The conduit spacer includes a base having generally planar portions and having at least one contiguous convex portion adjacent the generally planar portions, at least one generally U-shaped body supported above the base, each U-shaped body having an open end extending away from said base, stacking tabs extending from both ends of each U-shaped body, and stacking slots connected to the base and on left and right sides of the base, each stacking slot having a length greater than a length of each of the stacking tabs.

Another embodiment is a conduit spacer. The conduit spacer includes a base having generally planar portions and having at least one contiguous convex portion adjacent the generally planar portions and at least one generally U-shaped body supported above the base, each U-shaped body having an open end extending away from said base. The conduit spacer also includes at least two stacking tabs extending from ends of each U-shaped body and at least two stacking slots connected to the base and on opposite sides of the base in a direction perpendicular to a width of the base, each stacking slot further comprising an angled lead-in section.

Another embodiment is a method of assembling a duct bank. The method includes steps of furnishing at least two conduit spacers, each conduit spacer including a base having generally planar portions and having at least one contiguous convex portion adjacent the generally planar portions and at least two stacking slots connected to the base and on left and right sides of the base, each stacking slot having a taper in a general first direction (back to front or front to back) of a width of the base. Each conduit spacer also includes at least one generally U-shaped body supported above the base, each U-shaped body having an open end extending away from said base and stacking tabs extending from both ends of each U-shaped body, each stacking tab having a taper in a same first direction (back to front or front to back) of a width of the base. The method then includes steps of joining the at least two conduit spacers to form an assembly by inserting the at least two stacking tabs of a first of the at least two conduit spacers into the at least two stacking slots of a second of the at least two conduit spacers, such that a front face of each of the at least two conduit spacers faces in a same direction and a rear face of each of the at least two conduit spacers faces in an opposite direction.

Another embodiment is an end cap for a conduit spacer. The end cap includes a top surface, a bottom surface opposite the top surface, an outer surface connecting the top and bottom surfaces, and an inner surface adapted to form at least a partial interface with a conduit. The end cap also includes at least one male connector or at least one female connector proximate the inner surface, wherein the at least one male or female connector is adapted for engagement with a corresponding female or male connector of the conduit spacer. In one embodiment, the end cap is useful as a distance gage, wherein the end cap and the distance are adapted for use as a distance gage to control a thickness of a filler or concrete. In one embodiment, the open side is adapted for enclosing a circumference of a conduit between the end cap and the conduit spacer.

Other embodiments and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings.

While the invention will be described in connection with certain preferred embodiments, there is no intent to limit it to those embodiments. The intent is to cover all alternatives, modifications and equivalents as included within the spirit and scope of the invention as defined by the appended claims.

DETAILED DESCRIPTION

Figure 1:
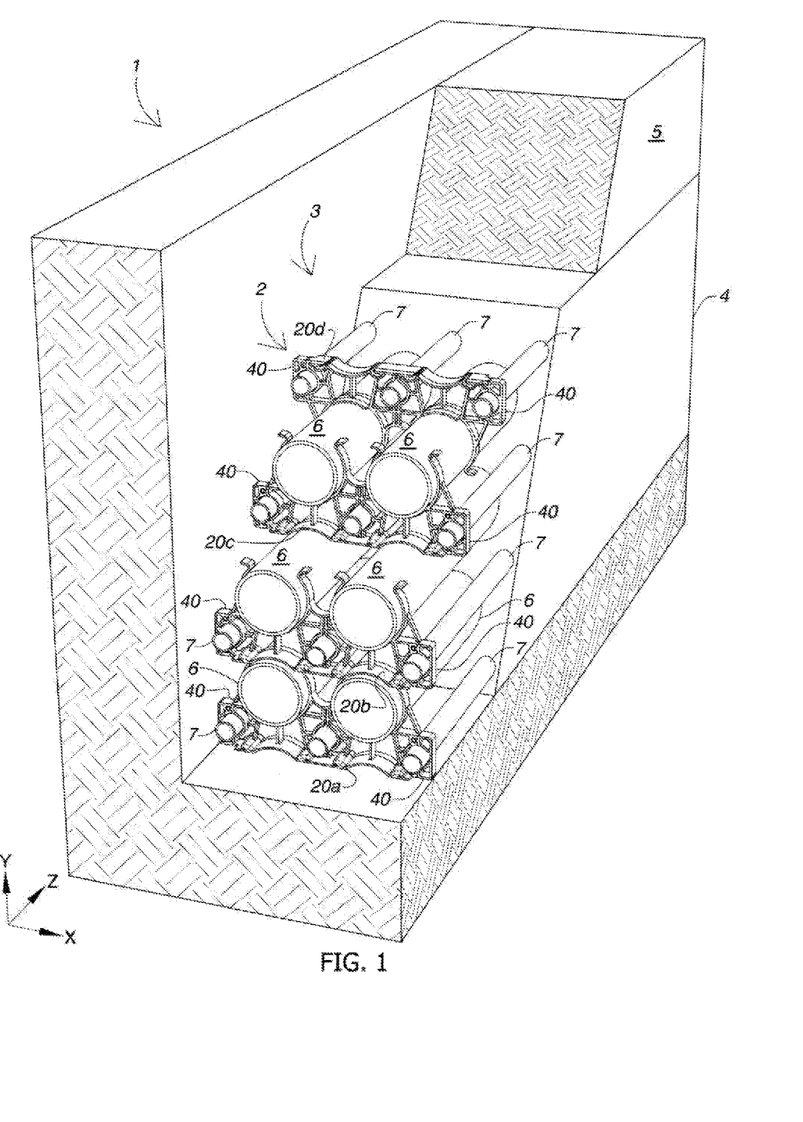
FIG. 1 depicts a perspective view of a duct bank installation with an embodiment of a duct bank and spacers described herein.

A first embodiment of a duct bank with the spacers described herein is presented in FIG. 1. The installation 1 includes a duct bank 2 which has been placed in a trench 3 and then encased in protective concrete 4. After the concrete cures, the installation is backfilled with the overburden or earth 5 that was previously removed. Duct bank 2 includes a bottom conduit spacer 20a, holding two large conduits 6 and three smaller conduits 7. A second conduit spacer 20b is mounted directly above, i.e., stacked and interlocked, atop bottom conduit spacer 20a. As will be detailed later, conduit spacers 20a, 20b are vertically interlocked and can only be disassembled intentionally. Conduit spacer 20b sits atop the two large conduits mounted in conduit spacer 20a. Conduit spacer 20b also mounts two large conduits 6 and three small conduits 7. Coordinate axes for reference are depicted in FIG. 1, with axis Z along a width of the spacers or a length of the duct bank, axis X along a front face or length of the spacers, that is, along a width of the duct bank, and axis Y along a height of the spacers or duct bank.

(Conduit spacer 20c also mounts two large conduits 6 and three small conduits 7. In one embodiment, the large conduits are 150 mm (about 6 inches) and the small conduits are 56 mm (about 2.2 inches). Conduit spacer 20c is staggered away from conduit spacers 20a, 20b, thus avoiding a shear plane, much as masons stagger bricks when they build a wall. Top conduit spacer 20d is staggered away from conduit spacer 20c and is mounted upside down. The height from the center-top of the large conduits 6 to the top of the inverted spacer 20d is about 3 inches (about 75 mm). The spacers also include end caps 40, explained below.

Figure 2:
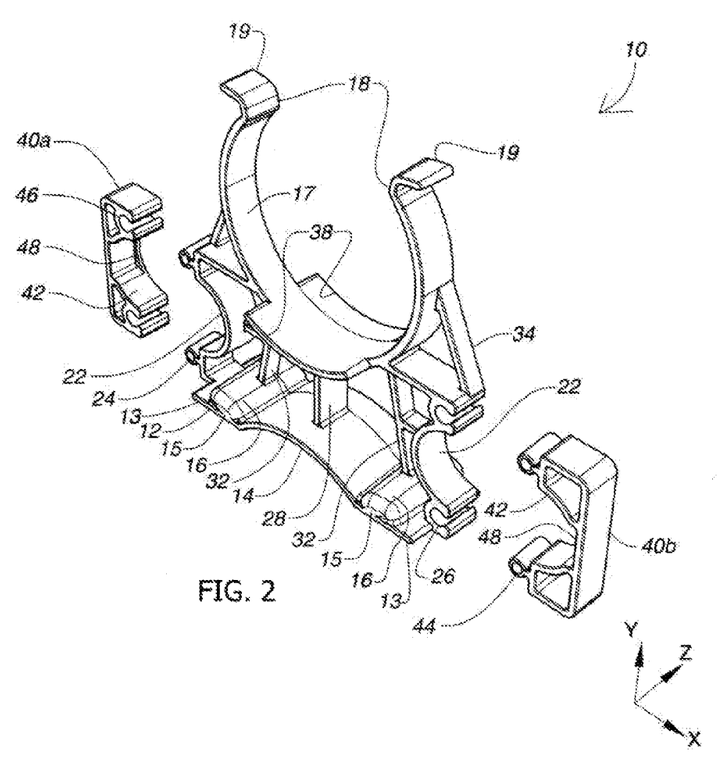
FIG. 2 depicts a perspective view of a first embodiment of a conduit spacer depicted in FIG. 1, with end caps shown removed for clarity.

An inverted spacer may act as a concrete gage, in that when the concrete is poured so that it covers the top conduit spacer 20d, there is a minimum distance of about 70-90 mm (about 2.7 inches to about 3.5 inches) of concrete covering the larger conduits. In one embodiment, for nominal 6-inch (150 mm) conduit, with 3 in (76 mm) horizontal and vertical spacing, a distance from the bottom of the spacer to the bottom of the inside of the U-shaped body, is about 121 mm (about 4.75 inches), or less. This insures an adequate amount of concrete at the base of the duct bank while not requiring an excess of concrete, such as allowed by conduit spacers that allow a larger gap. Table 1 below lists the maximum distance from the spacer bottom, or bottom of the spacer base, to the bottom inside of the at least one U-shaped body, for a series of spacers and conduit separations.

the base 12. The arcuate portion is convex, i.e., shaped like an outside of a sphere and in one embodiment, comprises about 90 degrees of arc of a circle. The bottom portion also includes slots 15, not visible in this view, formed within bosses 16. The upper portion includes a central generally U-shaped body 17, which is concave, shaped like an inside of a sphere or bowl, and forms about 270 degrees of a circle. The ends of the U-shaped body include transition portions 18 and end tabs 19. The slots 15 and tabs 19 are discussed below. In this embodiment of a spacer for a single conduit, there are slots 15 on the left and right sides of the base and tabs 19 on the left and right sides of the U-shaped body 17.

The U-shaped body at rest is biased slightly inward at the top from what would be 270° of a perfect circle or cylindrical shape. This inward bias creates a snap-fit, so that when a conduit with a circular cross section is inserted into the body, the end portions or arms of the U-shaped body positively retain the conduit. The U-shaped body 17 forms the central part of the support structure for the conduit. Spacer 10 also includes adjacent support sections 38 to form a wider support base. The central portion of the U-shaped body is supported by a vertical rib 28 and may also be supported by side ribs 32. The side ribs may be vertical or they may be angled somewhat from the vertical, as shown.

Lateral sides of the U-shaped body 17 are also supported by side buttresses 34. The left and right sides of spacer 10 form respectively male and female joining portions, with arc portions 22 and tabs 24 or slots 26 for engagement with an additional spacer or with respective female or male end caps 40a, 40b.

Figures 8, 8A, 8B:
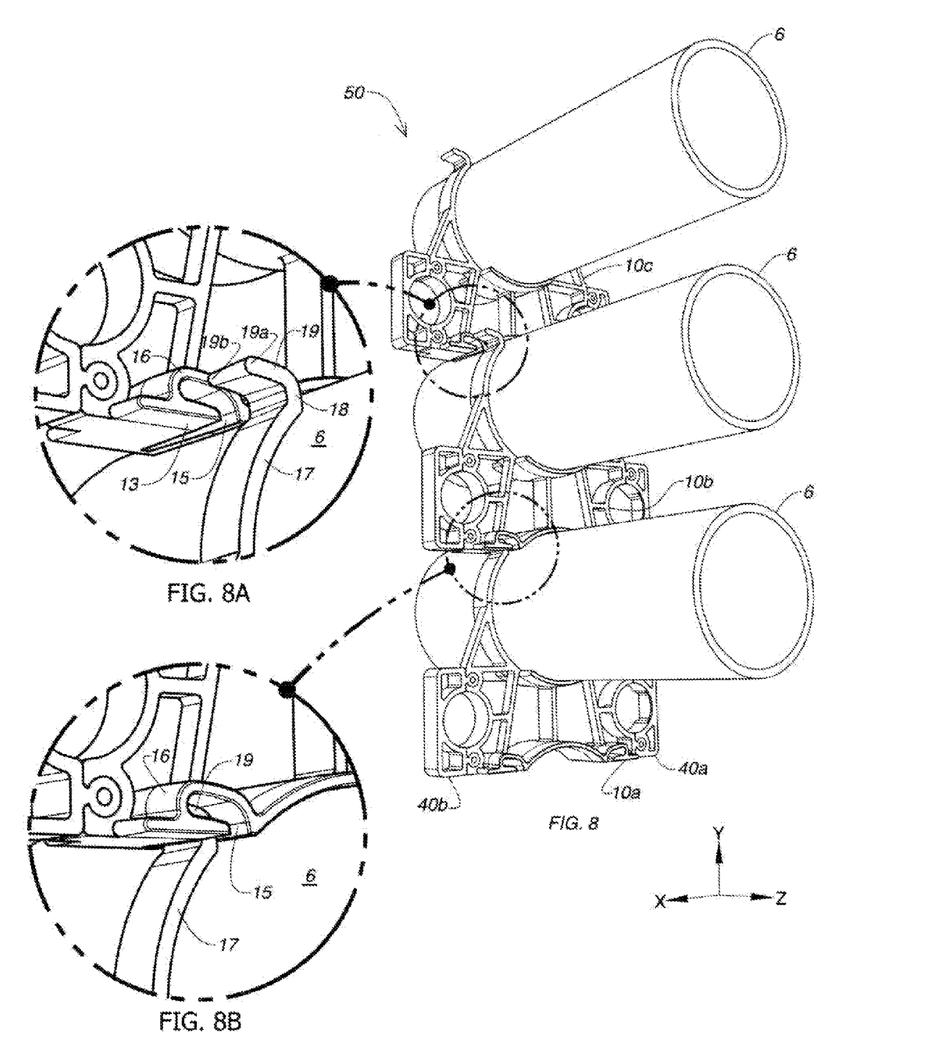
FIG. 8 depicts a rear perspective view of a duct bank with the stacked spacers of FIGS. 2 and 5.
FIGS. 8A and 8B depict a closer view of the assembly of a tab of a bottom spacer being inserted into a slot of a top spacer in the duct bank.

Female end cap 40a includes two arc portions 42, a central portion 48, and slots 46 for receiving engaging tabs 44 from male end cap 40b or from another spacer. Male end cap 40b also includes arc portions 42 and a center portion 48. The arc portions 42 form a generally semicircular shape for accommodating within center portion 48 an additional, usually smaller, conduit than the conduit accommodated in the U-shaped body 17, when connected to conduit spacer 10 or 20. As best seen in FIGS. 2 and 8, the arc portions 42, with arc portion 22 of spacer 10 or spacer 20, form a generally circular shape for accommodating the smaller conduit 7.

The end cap embodiments shown are generally in the shape of a semicircle or a capital letter C, with a closed side and an

TABLE 1

MAXIMUM DISTANCE FROM SPACER BOTTOM TO
INSIDE BOTTOM OF U-SHAPED BODY

| CONDUIT SIZE | | | Horizontal and Vertical Distance between conduits, also known as conduit separation | | | | | |
|---|---|---|---|---|---|---|---|---|
| | | | 1.500 IN (38 MM) | | 2.000 IN (51 MM) | | 3.000 IN (76 MM) | |
| Nom. dia, in. | Actual od, in. | Actual od, mm | Distance, in. | Distance, mm. | Distance, in. | Distance, mm | Distance, in. | Distance, mm |
| 2 | 2.375 | 60.33 | — | — | 3.062 | 78 | 4.000 | 102 |
| 3 | 3.500 | 88.90 | — | — | 3.250 | 83 | 4.188 | 106 |
| 4 | 4.500 | 114.3 | 3.188 | 101 | 3.438 | 87 | 4.375 | 111 |
| 5 | 5.563 | 141.3 | — | — | 3.625 | 92 | 4.562 | 116 |
| 6 | 6.625 | 168.3 | — | — | 3.812 | 97 | 4.750 | 121 |
| 8 | 8.625 | 219.1 | — | — | 4.000 | 102 | 4.938 | 125 |

Interpolate table for conduit sizes and conduit separations not shown.

Figure 3:
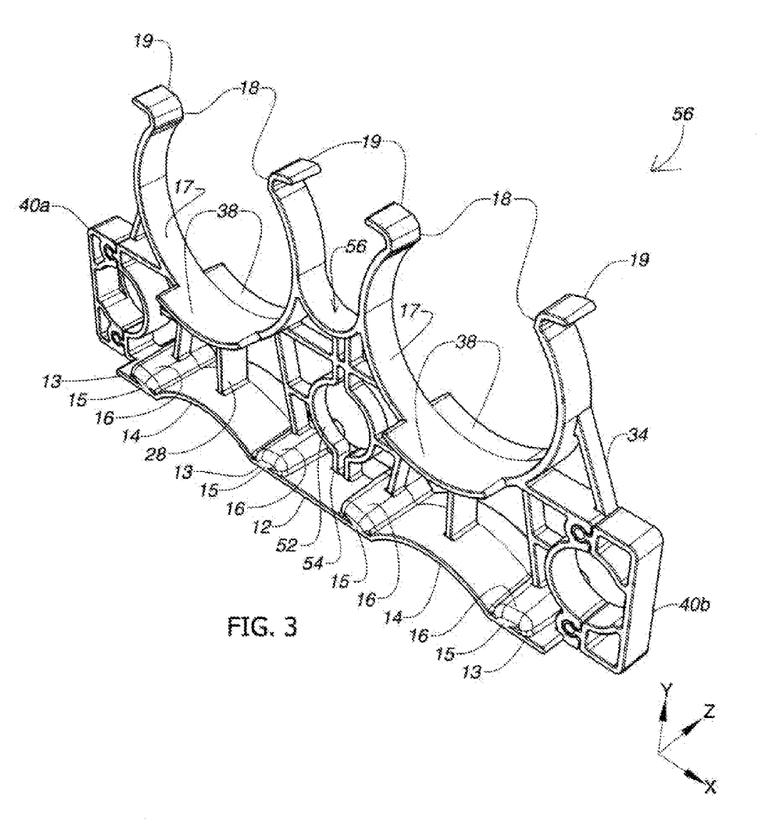
FIG. 3 depicts a perspective view of a second embodiment of a conduit spacer depicted in FIG. 1 with end caps shown assembled to the conduit spacer.
Figure 4:
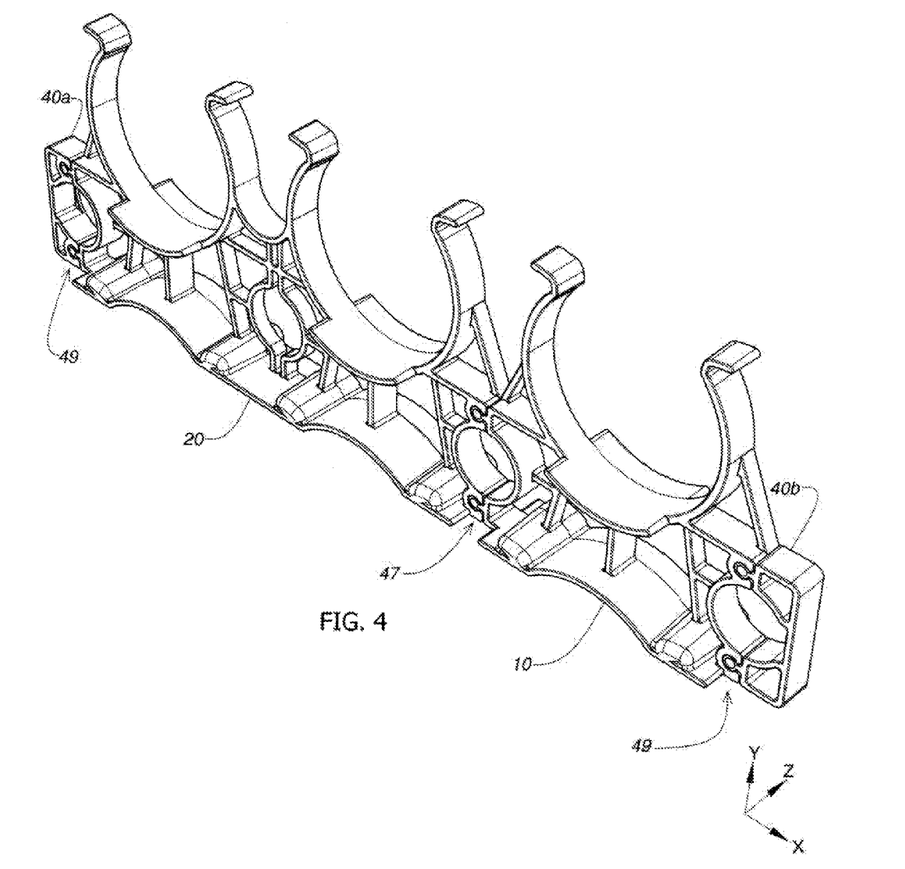
FIG. 4 depicts an assembly of the conduit spacers of FIGS. 2 and 3.

The conduit spacer 20 depicted in FIG. 1 is shown in greater detail in FIG. 3 and a simpler version of a conduit spacer 10, for a single conduit, is depicted in FIG. 2. Conduit spacer 10 includes a base 12 with flats 13 or flat portions on either end and an arcuate or curved portion 14 in the center of open side. The tabs extend outward from and are adjacent to the top and bottom sides in male end cap 40b. The slots extend inward and form part of the top and bottom sides in female end cap 40a. The top and bottom sides each enclose a hollow portion, which design strengthens the section modulus of the end cap, and also that of the conduit spacer to which it is attached, while adding little cost and weight. The tabs and slots of the spacers and end caps may also be considered as engaging rails and grooves. FIGS. 2-4 are front views of the end caps. The open side of end caps 40a, 40b in the front view includes two arcs 42 for interfacing with a conduit. As may be seen slightly in FIG. 2 and more clearly in FIG. 8, a rear view of the end caps and spacers 10, the open side of end caps 40a, 40b is generally a semicircle rather than arcs. The additional material helps the end caps more firmly support the conduits when the duct bank is assembled.

The end caps may be described in other terms. For example, the end caps may be described as having a top surface, a bottom surface opposite the top surface, and an outer surface connecting the top and bottom surfaces. The outer surface would be the straight surface, the side surface opposite the tabs or slots. The open area in a general shape of a semicircle or arcs could be described as an inner surface. As is apparent from FIGS. 2 and 8, the inner surface does not contact the outer surface, since the top and bottom surfaces, as well as the tabs or slots, are situated between the inner and outer surfaces.

In addition, the end caps are not limited to the embodiments shown. For example, an end cap may take on a general shape of a hollow square or rectangle with an interior bore or surface in a generally circular shape. This embodiment also has at least one tab or at least one slot on one side of the square or rectangle. In this embodiment, the sides are the outer surfaces connecting the top and bottom surfaces, and the inner bore constitutes the inner surface. As is apparent from the embodiments depicted in the drawings, the end caps have two tabs or slots, a tab or slot proximate the top and bottom surfaces of the end cap. In other embodiments, there is only one tab or slot, proximate either the top or the bottom surface of the end cap.

Two or more spacers 10 may be stacked vertically, using the tabs 19 at the top of a lower spacer and the slots 15 at the bottom of a spacer stacked atop the first spacer. Such spacers may be stacked in the general shape of a plane, as shown in FIG. 1. The spacers may also be laid side-by-side, as shown in FIG. 4. In FIG. 4, first spacer embodiment 10 is joined to a second spacer embodiment 20, using tabs 24 on the left side of spacer 10 and engagement slots on the right portion of spacer 20. In this configuration, male end cap 40b is joined to the slots 26 of spacer 10 on the right while female end cap 40a fits onto tabs 24 of spacer 20 on the left side. Spacers 10, 20 and their end portions form a generally circular cavity suitable for accommodating a conduit of a smaller diameter, while their U-shaped bodies are typically designed for a larger diameter. Spacers 10 and 20 are horizontally interlocked at joint 47, as are end caps 40a, 40b, at other joints or intersections 49.

FIG. 3 depicts spacer 20 in greater detail. Spacer 20 is designed to accommodate two conduits in adjacent U-shaped bodies 17. U-shaped bodies 17 form generally about 270 degrees of a circle, molded so that the end portions or arms near tabs 19 and transitions 18, are biased inwardly to create a snap fit. The base 12 of spacer 20 includes three flat portions 13 and two arcuate portions 14. Base 12 also includes bosses 16 with internal slots 15, not visible in this view. In one embodiment, the slots 15 are open on the front and rear. In other embodiments, the slots may be blind, that is, with only one end open to accommodate the engaging tab provided on the end of the U-shaped body for vertical stacking. Each U-shaped body 17 includes adjacent support structures 38 supported by a vertical rib 28 and additional ribs as shown. The U-shaped bodies are supported on the outer sides by buttresses 34 and on their inner sides by support structure 56, which includes ribs as shown, and forming an additional circular conduit support 52. Conduit support 52 is also supported by additional support structure 54 grounded to base 12.

The spacers herein described may be molded from any of a number of plastic materials, such as HDPE, LDPE, PP, HIPS, ABS, and so forth, by injection molding. They may also be thermoformed, compression molded, or made by any other desired method. The conduits which are typically accommodated may be nominally 150 mm (about 6 inches) diameter, or other desired diameter, e.g., 100 mm (about 4 inches) or 200 mm (about 8 inches). The spacers may be designed and manufactured to accommodate other desired sizes. The smaller conduits are typically a nominal 75 mm (about 3 inches), but may be 50 mm (about 2 inches), or other desired size, such as 25 mm (about 1 inch) diameter. The spacers may be made to accommodate other desired sizes.

An important design criterion in duct banks is the spacing between adjacent conduits, whether spaced in a single spacer or spaced within an assembly of two or more spacers. Spacing is typically necessary to minimize any undesirable heat effects or electrical interference caused by proximity. Spacing may be specified between adjacent large conduits, between adjacent smaller conduits, or between large and small conduits. For example, vertical or horizontal spacing, or both, of 70 mm (about 3 inches) may be specified between large conduits. Other desired spacing may be specified and achieved by using the appropriate support structures, lengths and heights of the ribs, and so forth. It is also desirable for the bottom portion of the spacers to have sufficient area to support the duct bank. The width (front to back) of the spacers may be about 64 mm wide, for example. Other widths may be used as desired for appropriate support. In one embodiment for 6-inch (150 mm) conduit, the spacers are designed for a minimum of 70 mm, 75 mm or 3 inches of spacing, both vertically and horizontally, between conduits located in the U-shaped bodies.

An important feature of the conduit spacers described herein is that they may be joined or stacked vertically, as well as horizontally. FIGS. 5, 5A, 6, 6A, 7 and 7A disclose additional details of conduit spacer 10. In the front view depicted in FIG. 5, three conduit spacers 10a, 10b and 10c are stacked and vertically interlocked atop each other along axis Y, each of the conduit spacers joined horizontally along axis X to end caps 40a, 40b. Each conduit spacer accommodates a single conduit 6. As noted previously, each conduit spacer includes a central vertical rib 28 and additional ribs 32, which are at a slight angle from vertical. The angle may be from about 5 degrees to about 30 degrees. Other angles may be used, including a vertical orientation.

Figure 5:
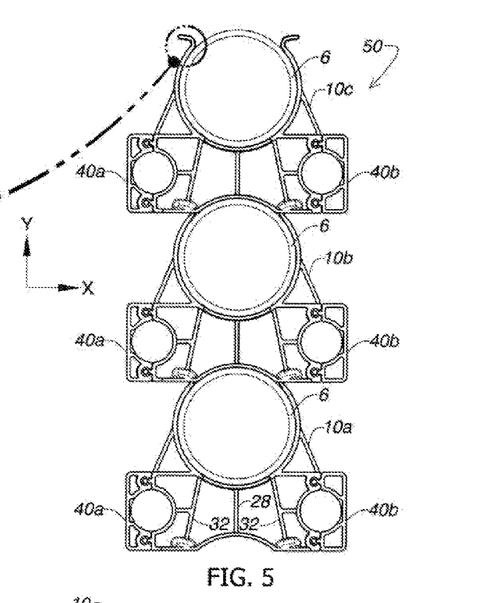
FIG. 5 depicts a front view of a stack of spacers as shown in FIG. 2.
Figure 5A:
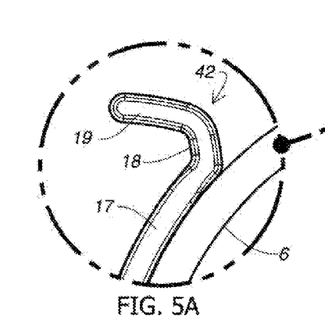
FIG. 5A depicts a closer view of the tabs of the spacers depicted in FIG. 5.
Figure 6:
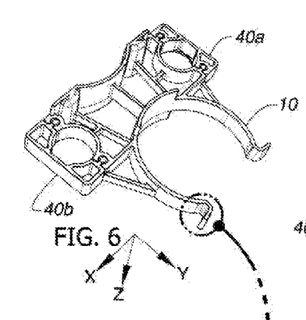
FIGS. 6 and 6A depict an inverted front perspective view of the spacer of FIG. 2, with a closer perspective view of the tab depicted in FIG. 6A.
Figure 6A:
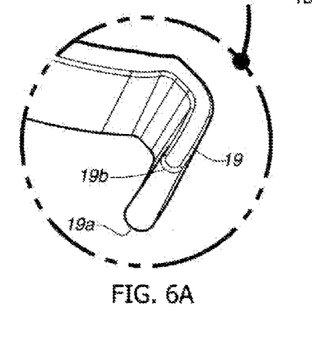

FIG. 5A depicts a closer view of the conduit 6 and the left portion of the U-shaped body 17. The U-shaped body 17 ends in a tab 19 connected by a transition portion 18. As seen in FIG. 5A, this embodiment of the transition portion 18 includes a straight portion between curved portions. This straight portion is believed to help lock the tab into place when two spacers are interlocked. In other embodiments, a gradual curve may be used instead.

FIGS. 6, 6A, 7 and 7A depict yet closer views of the tabs and slots of spacer 10. In one embodiment, the tabs and slots are tapered, with a narrow portion of the slots ending blind, i.e., there is a blind slot, with the closed end on the front of the spacer. The tab is designed so that its narrow portion is inserted into the wide or open portion of the slot. Thus, in FIGS. 6 and 6A, spacer 10 includes tab 19 with wide portion 19a and narrow tapered portion 19b. The narrow portion 19b will be inserted into the slot. Narrow portion 19b will face the front of the spacer and wide portion 19a will face the rear of the spacer. The taper of the tabs in one embodiment is from about 0.5° to about 2° per side. In another embodiment, the taper is from about 1" to about 2° per side.

Figure 7:
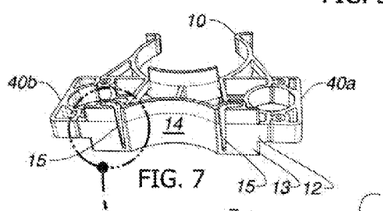
FIGS. 7 and 7A depict bottom, rear perspective views of the spacer of FIG. 2, with FIG. 7A depicting a closer view of the bottom and slot portion of the spacer.
Figure 7A:
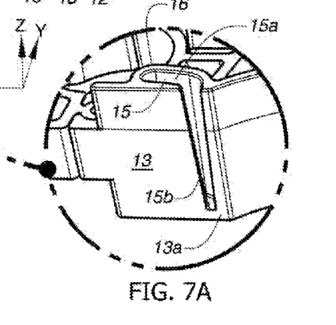

FIGS. 7 and 7A detail the placement and geometry of the slots. Slot 15 is molded into boss 16, the slot opening into flat portion 13 of the base 12 of the spacer. In other embodiments, the slot may not open onto the bottom of the spacer and may form a completely blind slot. Slot 15 includes a wide, open portion 15a facing the rear of the spacer, with narrow portion 15b ending in a blind or closed end on the front face of the spacer. In this disclosure, a blind slot includes a slot with one portion open to the bottom, as seen in FIGS. 7 and 7A, and also includes a completely blind slot with only a single opening, as in portion 15a. In this embodiment, base arcuate portion 14 is adjacent, that is, touches, flat portion 13, at least at the outer tip 13a of the flat portion. Accordingly, base 12 includes flats 13 that are adjacent and contiguous to the arcuate portion or portions of the spacer. In addition, the slots open to a bottom surface of the flat portions 13 of the spacer. The slots are oriented in one embodiment at an upward angle of 9 degrees from horizontal. Other embodiments have the slots oriented at an angle from about 0 degrees to about 45 degrees from horizontal. In yet another embodiment, the bosses and slots may be raised higher and the slots actually tilted downward at an angle. The taper of the slots in one embodiment is about 2° per side; in another embodiment, the taper is from about 0.5° to about 2° per side.

Base 12 includes a continuous run of material from the left side to the right side of the spacer, as seen in FIG. 7. The arcuate portion or portions 14 run directly to the feet or flat portions 13, that is, the arcuate portions are contiguous with the feet and connect directly with the feet. The arcuate portions also directly support the U-shaped body for a large conduit through rib 28. Thus, the design of spacer 10 is very strong, since the supports from the U-shaped body run directly through straight ribs 28, 32 to the arcuate section 14 or bosses 16 of base 12.

FIGS. 8, 8A and 8B depict rear perspective views of stacked spacers with close-ups of the tapered tab-and-slot connections. In FIG. 8, three spacers 10a, 10b and 10c are stacked one atop another and are vertically interlocked with their tabs and slots. Each spacer houses a 150 mm conduit 6 and each spacer also is mated to a female end cap 40a on one side and to a male end cap 40b on the opposite side. FIG. 8A depicts an arm of a U-shaped body 17 from lower spacer 10b connecting to a slot 15 of upper spacer 10c. The arm includes transition portion 18 and end tab 19. Note that the outer face 19a of tab 19 is wide, while the tab tapers to a narrow, inner face 19b, which is being inserted into the slot 15. Slot 15 is a cavity in boss 16. As noted above, slot 15 is also tapered as shown in FIG. 7A. Since slot 15 is blind, the open, wider end is the portion visible in FIG. 8A, and is the end into which the tab 19 is being inserted. Note that both the tab and the slot taper, that is they narrow, in the direction of the width of the spacer, axis Z, i.e., the narrowest of the three dimensions of the conduit spacer. Note also that slot 15 opens onto flat portion or foot 13.

In FIG. 8B, tab 19 has been inserted into slot 15 of boss 16. Note that the insertion length of tab 19 is less than the insertion length of slot 15, allowing tab 19 to be inserted completely into the slot. In one embodiment, the slot length is about twice the length of the tab, both in the direction of axis Z. This allows for easier assembly, since a little play is allowed in making the connections.

Figure 9:
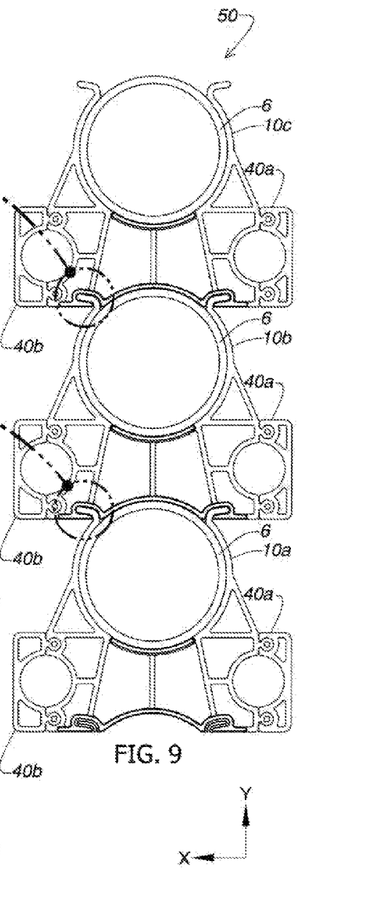
FIG. 9 depicts a rear view of another embodiment of a duct bank assembly with stacked duct bank spacers.

FIGS. 9, 9A-9D and 10A-10D disclose additional embodiments and views of the spacers and the slots and tabs. FIG. 9 is a rear elevation of a stack of conduit spacers, similar to the embodiment of FIG. 8, with the conduit spacers in a stacked configuration. Spacer 10a rests on the ground and is connected to end caps 40a, 40b, as are spacers 10b, 10c. Spacer 10b is atop spacer 10a and is connected to spacer 10a with the tab-and-slot arrangement discussed above. Spacer 10c is atop spacer 10b and is also connected with tabs and slots. Each of the spacers contains a conduit 6.

Figure 9A:
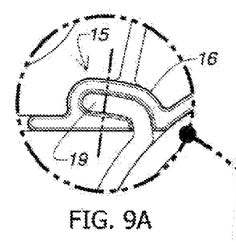
FIGS. 9A-9D depict closer and cross-sectional views of the assembly of a tab of a first spacer into a slot of a second spacer.
Figure 9B:
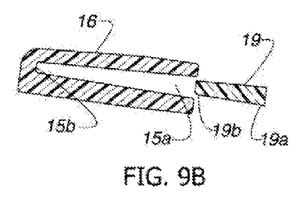
Figure 9C:
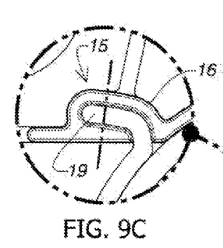
Figure 9D:
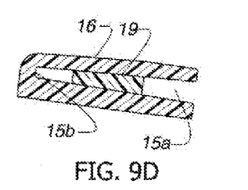

As shown in FIG. 9A, top spacer 10c includes a boss 16 with a slot 15 while middle spacer 10b includes tab 19. FIG. 9B depicts tab 19 about to be inserted into the slot in the general direction of axis Z. Tab 19 is tapered along axis Z in the direction of the width of the spacer, with a wider end 19a and narrow end 19b, and is shown in cross section in the perpendicular orientation of FIG. 9B. Slot 15 also has a wide end 15a and a narrow or blind end 15b. FIGS. 9C-9D depict the tab 19 inserted into the slot. Note that the length of the slot 15, along axis Z, is considerably longer, about twice as long, as a length of the tab 19.

Figure 10A:
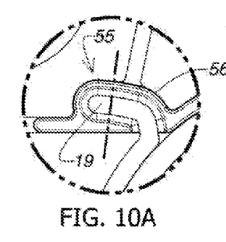
FIGS. 10A-10D depict closer and cross-sectional views of the assembly of a tab of a first spacer into a slot of a second embodiment of a spacer.
Figure 10B:
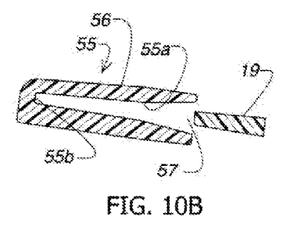
Figure 10C:
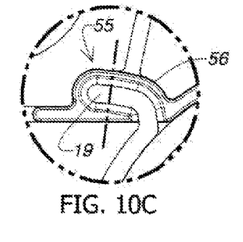
Figure 10D:
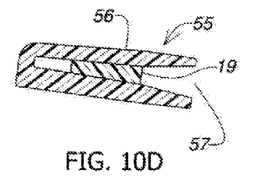

Another embodiment of slots and tabs is depicted in FIGS. 10A-10D, which the slots have a separate and distinct lead-in section. As shown in FIG. 10A, middle spacer 10b has a boss 56 with an internal slot 55, while bottom spacer 10a has a tab 19. Slot 55 includes a lead-in portion 57, an intersection 55a and a blind end 55b. The lead-in 57 is tapered at a first wide angle, allowing for easier engagement with the tab 19. The slot angle changes at the intersection 55a to a narrower angle, and then continues to the blind end 55b. For example, the wider first angle may be about 8 degrees per side, and the angle following the intersection 55a may be about 2 degrees per side. Other embodiments may use other angles. As noted above, the tab 19 has a length less than a length of the slot, allowing for complete insertion of the tab 19 into slot 55.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. Skilled artisans will use such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A conduit spacer, comprising:
    a base having generally planar portions and having at least one contiguous convex portion adjacent the generally planar portions;
    at least two stacking slots connected to the base and on left and right sides of the base, each stacking slot having a taper in a general first direction (back to front or front to back) of a width of the base;
    at least one generally U-shaped body supported above the base, each U-shaped body having an open end extending away from said base; and
    stacking tabs extending from both ends of each U-shaped body, said stacking tabs having a taper in a same general first direction (back to front or front to back) of a width of the base.

2. The conduit spacer according to claim 1, wherein the stacking slots are blind slots and wherein a narrower end of each stacking slot is blind and a wider end of each stacking slot is open.

3. The conduit spacer according to claim 1, wherein the at least two stacking slots and the at least two stacking tabs are generally at an angle of about 0 degrees to about 45 degrees from horizontal.

4. The conduit spacer according to claim 1, wherein each of the at least two stacking slots have a length great than a length of each the at least two stacking tabs.

5. The conduit spacer according to claim 1, wherein the at least two stacking slots further comprise a lead-in section having a greater angle than an angle of the slots.

6. The conduit spacer according to claim 1, further comprising a transition section in each of the at least two stacking slots and each of the at least two stacking tabs.

7. The conduit spacer according to claim 1, wherein the conduit spacer comprises left and right sides, and further comprising at least one end tab on one of the left and right sides and at least one end slot on the other of the left and right sides.

8. The conduit spacer according to claim 7, wherein the at least one end tab and the at least one end slot are tapered in a same general first direction.

9. The conduit spacer according to claim 7, further comprising at least one end cap having an engagement end tab or end slot.

10. The conduit spacer according to claim 7, wherein the conduit spacer comprises two end tabs on the left side and two end slots on the right side.

11. An end cap for a conduit spacer according to claim 7, the end cap comprising:
    a top surface;
    a bottom surface opposite the top surface;
    an outer surface connecting the top and bottom surfaces;
    an inner surface adapted to form at least a partial interface with a conduit; and
    at least one male connector or at least one female connector proximate the inner surface,
    wherein the at least one male or female connector is adapted for engagement with a corresponding female or male connector of the conduit spacer.

12. The end cap according to claim 11, wherein the at least one male or female connector comprises two male or female connectors, with one said connector proximate each of the top and bottom surfaces.

13. The end cap according to claim 11, wherein the end cap extends a distance from the conduit spacer and wherein the end cap and the distance are adapted for use as a distance gage to control a thickness of a filler or concrete.

14. The end cap according to claim 11, wherein the inner surface has a general shape selected from the group consisting of a semicircle and two arcs.

15. The end cap according to claim 11, wherein the inner surface has a general shape consisting of a circle contained within the outer surface.

16. The end cap according to claim 11, wherein the top and bottom surfaces each enclose a hollow.

17. The end cap according to claim 11, wherein the open surface is adapted for enclosing a circumference of a conduit between the end cap and the conduit spacer.

18. A conduit spacer, comprising:
    a base comprising generally planar portions;
    at least two stacking slots connected to the base and on left and right sides of the base, each stacking slot having a taper in a general first direction (back to front or front to back) of a width of the base, wherein a narrower end of each stacking slot is blind and a wider end of each stacking slot is open;
    at least one generally U-shaped body supported above the base, each U-shaped body having an open end extending away from said base; and
    stacking tabs extending from both ends of each U-shaped body, said stacking tabs having a taper in a same general first direction of a width of the base.

19. The conduit spacer of claim 18, further comprising generally vertical ribs extending from the generally U-shaped body to ribs comprising the stacking slots.

20. The conduit spacer of claim 18, wherein a width of the base including the stacking slots is the same width as a widest portion of the generally U-shaped body.

21. The conduit spacer of claim 18, wherein no portion of the spacer is wider than a widest portion of the generally U-shaped body.

22. The conduit spacer of claim 18, wherein the base comprises at least one contiguous convex portion adjacent the generally planar portions.

23. A conduit spacer, comprising:
    a base having generally planar portions and having at least one contiguous convex portion adjacent the generally planar portions;
    at least two stacking slots connected to the base, on left and right sides of the base, and opening to a bottom surface of the base, each stacking slot having a taper in a general first direction (back to front or front to back) of a width of the base;
    at least one generally U-shaped body supported above the base, each U-shaped body having an open end extending away from said base; and
    stacking tabs extending from both ends of each U-shaped body, said stacking tabs having a taper in a same general first direction of a width of the base.

24. The conduit spacer of claim 23, wherein each of the at least two stacking tabs has a linear portion in a transition portion from the U-shaped body.

25. The conduit spacer of claim 23, wherein a maximum distance from a bottom inside of the at least one U-shaped body to a bottom of the base is as shown in a table below for a given conduit size and conduit separation:

| CONDUIT SIZE | | | Horizontal and Vertical Distance between conduits, also known as conduit separation | | | | | |
|---|---|---|---|---|---|---|---|---|
| Nom. | Actual | | 1.500 IN (38 MM) | | 2.000 IN (51 mm) | | 3.000 IN (76 MM) | |
| dia, in. | Actual od, in. | od, mm | Distance, in. | Distance, mm. | Distance, in. | Distance, mm | Distance, in. | Distance, mm |
| 2 | 2.375 | 60.33 | — | — | 3.062 | 78 | 4.000 | 102 |
| 3 | 3.500 | 88.90 | — | — | 3.250 | 83 | 4.188 | 106 |
| 4 | 4.500 | 114.3 | 3.188 | 101 | 3.438 | 87 | 4.375 | 111 |
| 5 | 5.563 | 141.3 | — | — | 3.625 | 92 | 4.562 | 116 |
| 6 | 6.625 | 168.3 | — | — | 3.812 | 97 | 4.750 | 121 |
| 8 | 8.625 | 219.1 | — | — | 4.000 | 102 | 4.938 | 125 |

26. A conduit spacer, comprising:
a base having generally planar portions and having at least one contiguous convex portion adjacent the generally planar portions;
at least one generally U-shaped body supported above the base, each U-shaped body having an open end extending away from said base;
stacking tabs extending from both ends of each U-shaped body; and
stacking slots connected to the base and on left and right sides of the base, each stacking slot having a length greater than a length of each of the stacking tabs, wherein stacking tabs from a first conduit spacer are accommodated in stacking slots from a second conduit spacer to allow interlocking stacking of the conduit spacers.

27. The conduit spacer of claim 26, wherein each stacking tab has a taper in a first direction of a width of the base and each stacking slot has a taper in a same first direction.

28. A conduit spacer, comprising:
a base having generally planar portions and having at least one contiguous convex portion adjacent the generally planar portions;
at least one generally U-shaped body supported above the base, each U-shaped body having an open end extending away from said base;
at least two stacking tabs extending from ends of each U-shaped body; and
at least two stacking slots connected to the base and on opposite sides of the base in a direction perpendicular to a width of the base, each stacking slot further comprising an angled lead-in section, wherein stacking tabs from a first conduit spacer are accommodated in stacking slots from a second conduit spacer to allow interlocking stacking of the conduit spacers.

29. The conduit spacer of claim 28, wherein the stacking tabs and stacking slots are tapered in a same direction along a width of the conduit spacer.

30. A method of assembling a duct bank, the method comprising:
furnishing at least two conduit spacers, each conduit spacer comprising:
a base having generally planar portions and having at least one contiguous convex portion adjacent the generally planar portions;
at least two stacking slots connected to the base and on left and right sides of the base, each stacking slot having a taper in a general first direction (back to front or front to back) of a width of the base;
at least one generally U-shaped body supported above the base, each U-shaped body having an open end extending away from said base; and
stacking tabs extending from both ends of each U-shaped body, each stacking tab having a taper in a same first direction (back to front or front to back) of a width of the base; and
joining the at least two conduit spacers to form an assembly by inserting the at least two stacking tabs of a first of the at least two conduit spacers into the at least two stacking slots of a second of the at least two conduit spacers, such that a front face of each of the at least two conduit spacers faces in a same direction and a rear face of each of the at least two conduit spacers faces in an opposite direction.

31. The method of claim 30, wherein each of the at least two stacking slots has an engagement length greater than an engagement length of each of the at least two stacking tabs, and wherein during the step of joining the at least two conduit spacers, the engagement length of the at least two stacking tabs is completely inserted into the engagement length of the at least two stacking slots.

32. The method of claim 30, wherein the at least two stacking slots are blind slots, and wherein during the step of joining, a tapered end of the at least two stacking tabs does not contact a tapered end of the at least two stacking slots.

* * * * *